United States Patent
Herault

(10) Patent No.: US 9,216,665 B2
(45) Date of Patent: Dec. 22, 2015

(54) PREMIUM SEAT OFFERING EXTRA WIDE BED

(75) Inventor: Patrick Herault, Saint Hilaire en Lignieres (FR)

(73) Assignee: Zodiac Seats France, Issoudon (FR)

( * ) Notice: Subject to any disclaimer, the term of this patent is extended or adjusted under 35 U.S.C. 154(b) by 385 days.

(21) Appl. No.: 13/600,438

(22) Filed: Aug. 31, 2012

(65) Prior Publication Data

US 2013/0076082 A1 Mar. 28, 2013

Related U.S. Application Data

(60) Provisional application No. 61/530,688, filed on Sep. 2, 2011.

(51) Int. Cl.
| | |
|---|---|
| *A47B 83/02* | (2006.01) |
| *B60N 2/00* | (2006.01) |
| *B60N 2/46* | (2006.01) |
| *B60N 3/00* | (2006.01) |
| *B64D 11/06* | (2006.01) |

(52) U.S. Cl.
CPC ............... *B60N 2/00* (2013.01); *B60N 2/4606* (2013.01); *B60N 3/002* (2013.01); *B64D 11/06* (2013.01); *B64D 11/0606* (2014.12); *B64D 11/0638* (2014.12); *B64D 11/0641* (2014.12); *B64D 11/0646* (2014.12)

(58) Field of Classification Search
CPC .......... A47C 13/00; A47C 1/124; A47C 7/70; A47B 83/045
USPC .................. 297/118, 248, 145, 147, 162, 173
See application file for complete search history.

(56) References Cited

U.S. PATENT DOCUMENTS

| | | | |
|---|---|---|---|
| 4,834,449 A | 5/1989 | Engelman | |
| 6,056,239 A | 5/2000 | Cantu et al. | |
| 6,692,069 B2 * | 2/2004 | Beroth et al. | 297/118 |
| 8,011,723 B2 * | 9/2011 | Park et al. | 297/118 |
| 8,690,254 B2 * | 4/2014 | Cailleteau | 297/411.36 |
| 2006/0097553 A1 * | 5/2006 | Spurlock et al. | 297/248 |
| 2007/0246981 A1 * | 10/2007 | Plant | 297/248 |
| 2007/0284920 A1 * | 12/2007 | Mehaffey et al. | 297/162 |
| 2008/0203778 A1 * | 8/2008 | Weber et al. | 297/162 |

(Continued)

FOREIGN PATENT DOCUMENTS

| | | |
|---|---|---|
| DE | 10031700 A1 | 1/2002 |
| EP | 0949116 A1 | 10/1999 |

(Continued)

OTHER PUBLICATIONS

International Search Report and Written Opinion dated Jan. 30, 2013 in Application No. PCT/IB2012/055494.
International Preliminary Report on Patentability dated Mar. 13, 2014 in Application No. PCT/IB2012/054494.

*Primary Examiner* — David R Dunn
*Assistant Examiner* — Alexander Harrison
(74) *Attorney, Agent, or Firm* — Kilpatrick Townsend & Stockton LLP; Dean W. Russell; Kristin M. Crall

(57) ABSTRACT

Embodiments of the invention provide premium seats for aircraft and other passenger transport vehicles that provide extra seat room by providing an improved tray table configuration, which also enhances privacy for each passenger. Certain embodiments also provide an improved outer armrest configuration.

14 Claims, 8 Drawing Sheets

(56) References Cited

U.S. PATENT DOCUMENTS

2010/0252680 A1* 10/2010 Porter .................. 244/118.6
2010/0327634 A1* 12/2010 Johnson .................. 297/118
2014/0159440 A1* 6/2014 Porter .................. 297/163

FOREIGN PATENT DOCUMENTS

| EP | 1078852 A2 | 2/2001 |
| JP | 2001138998 A | 5/2001 |
| WO | 2013030797 A1 | 3/2013 |

* cited by examiner

PREMIUM SEAT OFFERING EXTRA WIDE BED

CROSS REFERENCE TO RELATED APPLICATIONS

This application claims the benefit of U.S. Provisional Application Ser. No. 61/530,688, filed Sep. 2, 2011, titled "Premium Seat Offering Extra Wide Bed," the entire contents of which are hereby incorporated by reference.

FIELD OF THE INVENTION

Embodiments of the present invention relate generally to premium seats for aircraft and other passenger transport vehicles that provide extra seat room. Certain embodiments are also designed to allow easier access to the seat.

BACKGROUND

Premium seats for civil aircraft have various seat positions, from the most upright to a full flat or lie flat bed position, especially for long or overseas flights. It is desirable to provide premium seats that allow such flexibility in seat movement, but that also provide as much space as possible for the passenger in each desired position.

Additionally, passenger vehicle seats need to be designed in order to provide easy access to passengers, particularly disabled passengers. For that reason, aisle side armrest are usually either removable, droppable, or rotatable in order to allow a passenger to be translated laterally from a wheel chair to the seat (or to otherwise provide increased access to the seats).

BRIEF SUMMARY

Embodiments of the invention described herein thus provide premium seats for aircraft and other passenger transport vehicles that offer extra seat room by providing a new tray table configuration, which also enhances privacy for each passenger. Certain embodiments also provide an improved outer armrest configuration.

DETAILED DESCRIPTION

Figure 1:
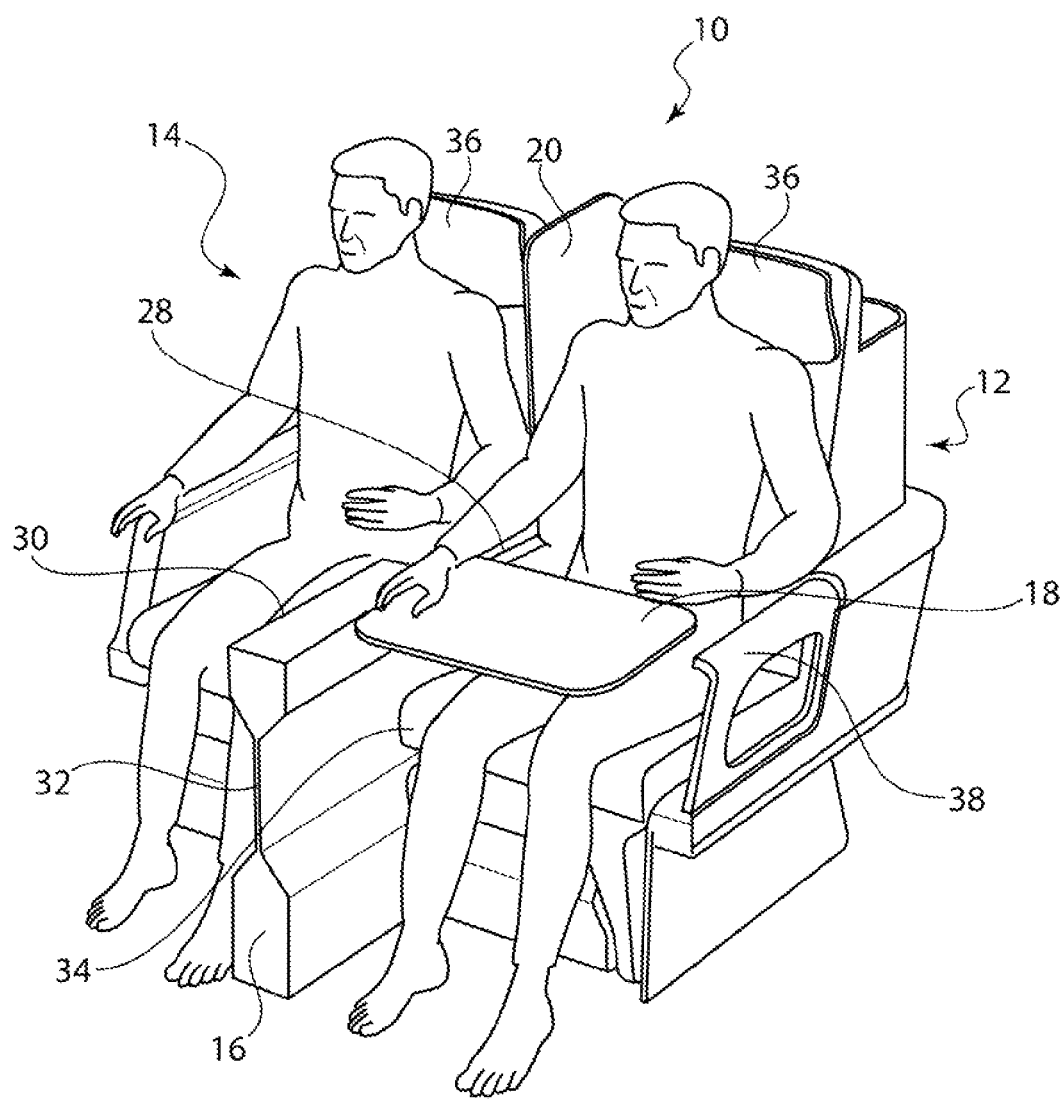
FIG. 1 shows a front perspective view of a seating system according to one embodiment of the invention, with one of the tray tables in a deployed position and both of the seats in the upright position.
Figure 2:
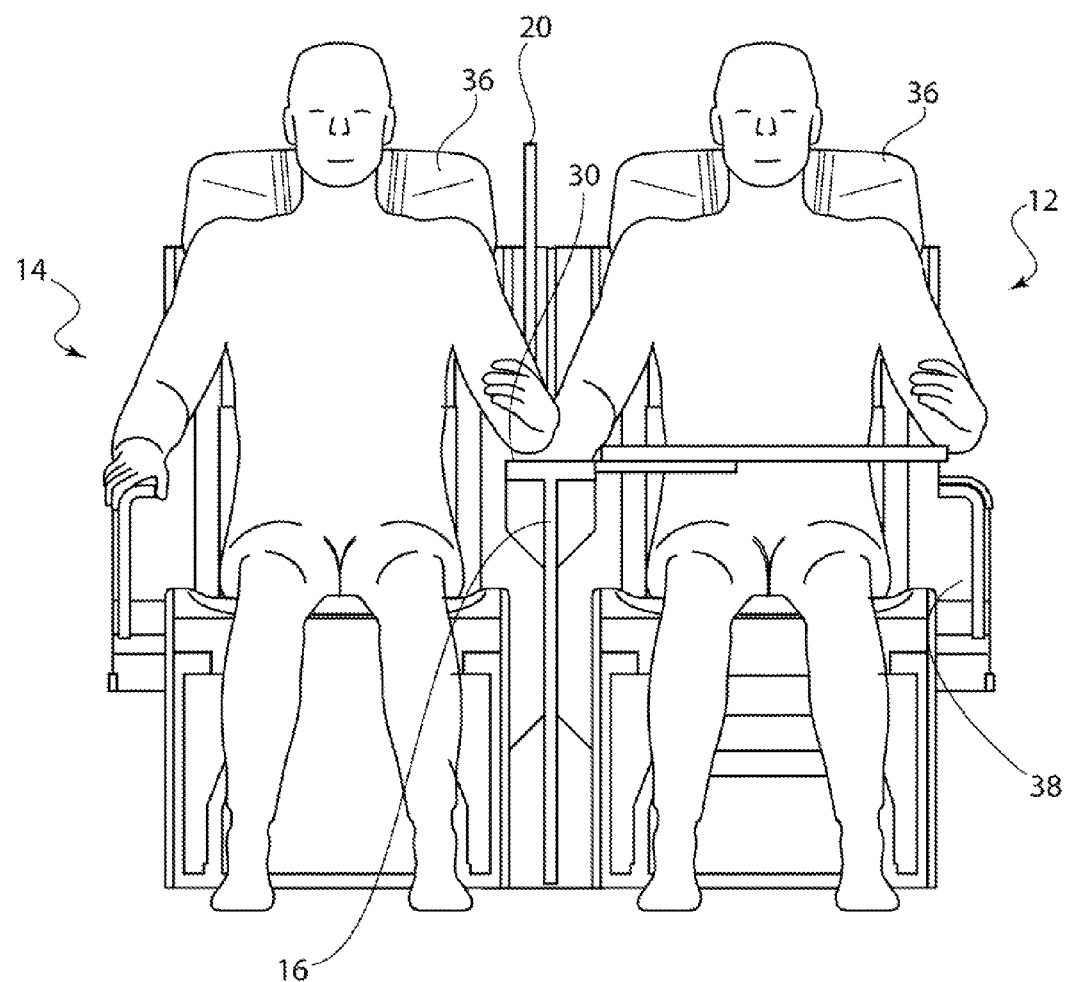
FIG. 2 shows a front plan view of the seating system of FIG. 1.
Figure 3:
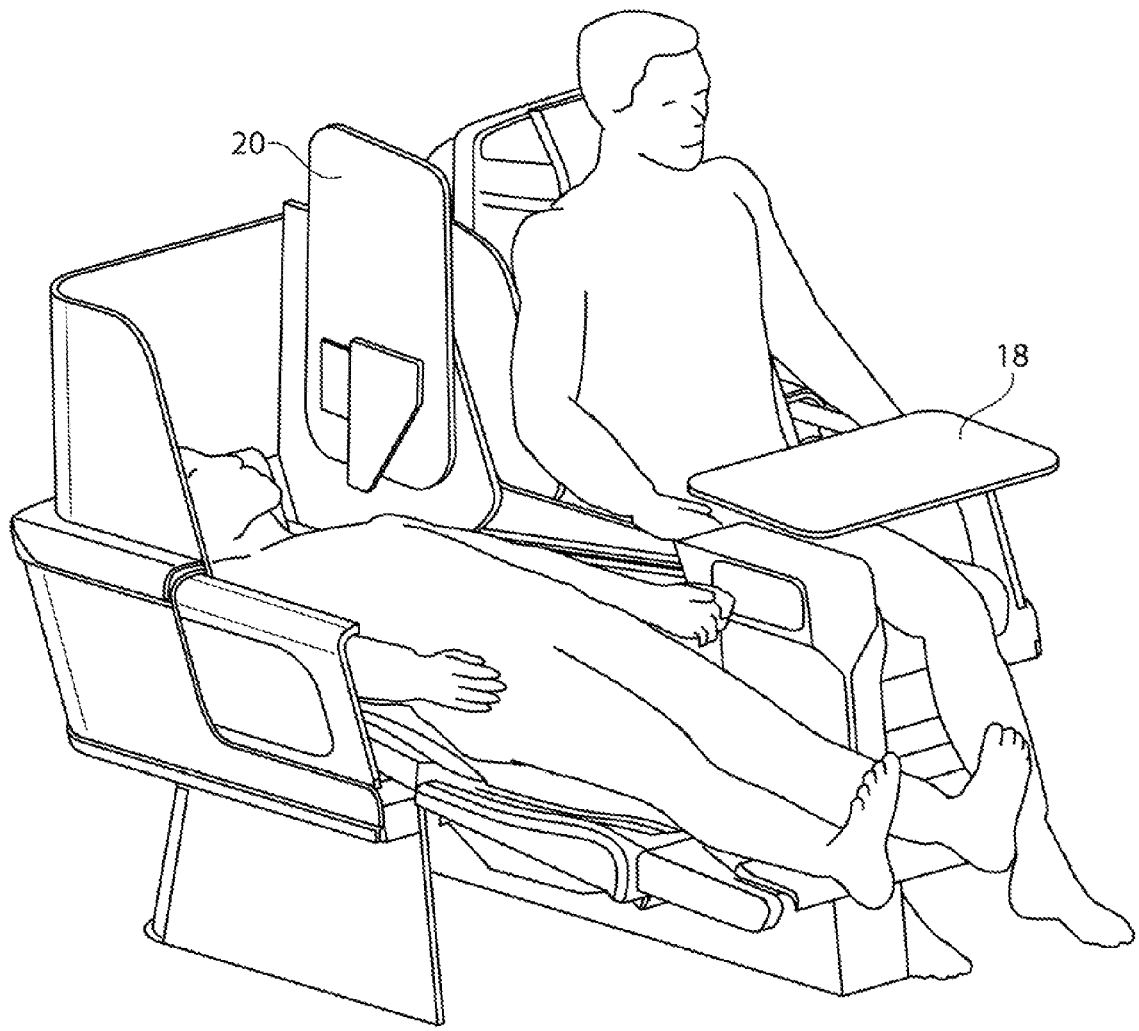
FIG. 3 shows a side perspective view of the seating system of FIG. 1, with one of the tray tables in a deployed position and one of the seats in the bed position.
Figure 4:
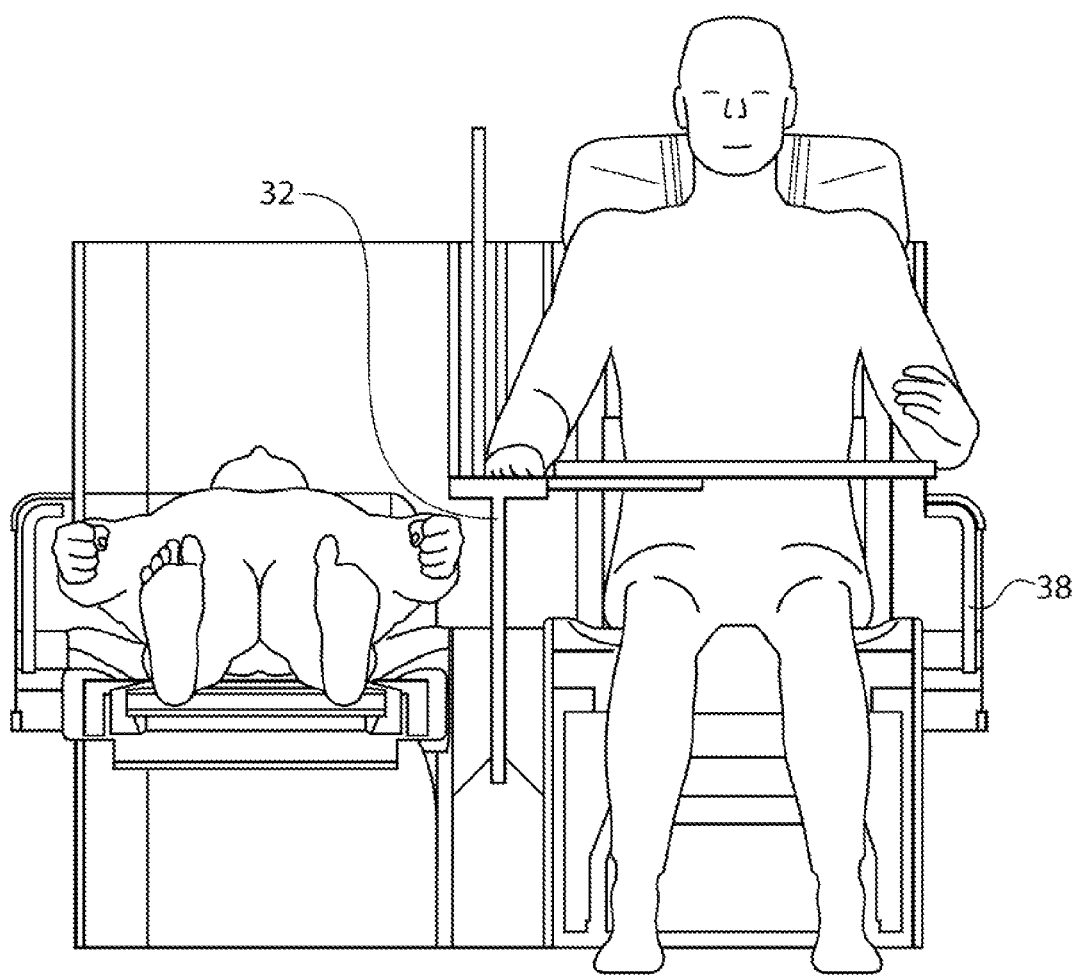
FIG. 4 shows a front plan view of the seating system configuration of FIG. 3.

Embodiments of the present invention provide improved passenger seating systems for passenger transport vehicles. Although they are particularly useful in connection with commercial aircraft and/or private aircraft, they may also be installed on buses, trains, RVs, or any other vehicle where passengers may desire larger seating spaces for longer travel times. As shown in FIG. 1, the seating system 10 generally includes at least two seats 12, 14 separated by a center console 16. Although a seating system with two seats is shown, it should be understood that the concepts described herein are equally applicable to seating systems having more than two seats, such as three, four, or more seats in an aisle. There will be provided a single center console for a two-seat unit, and two center consoles provided for a three-seat unit, and so forth, with one center console between adjacent seats. Center console 16 is shown having two trays 18, 20 associated therewith (although it should be understood that a center console for an odd-number of seats in a system may only need to have one tray associated therewith.)

Figure 5:
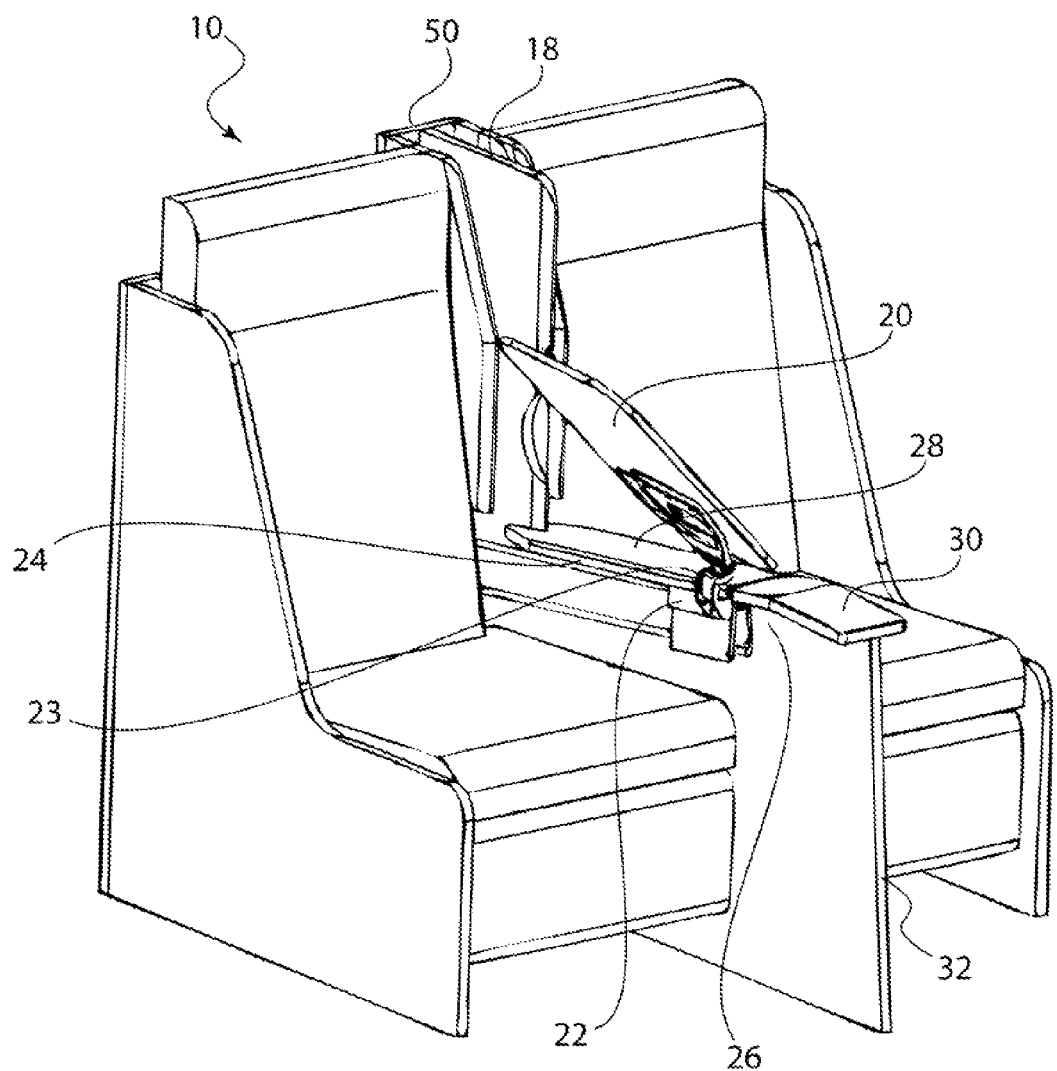
FIG. 5 shows a side perspective view of a first tray table embodiment having a hinge and a slide.
Figure 6:
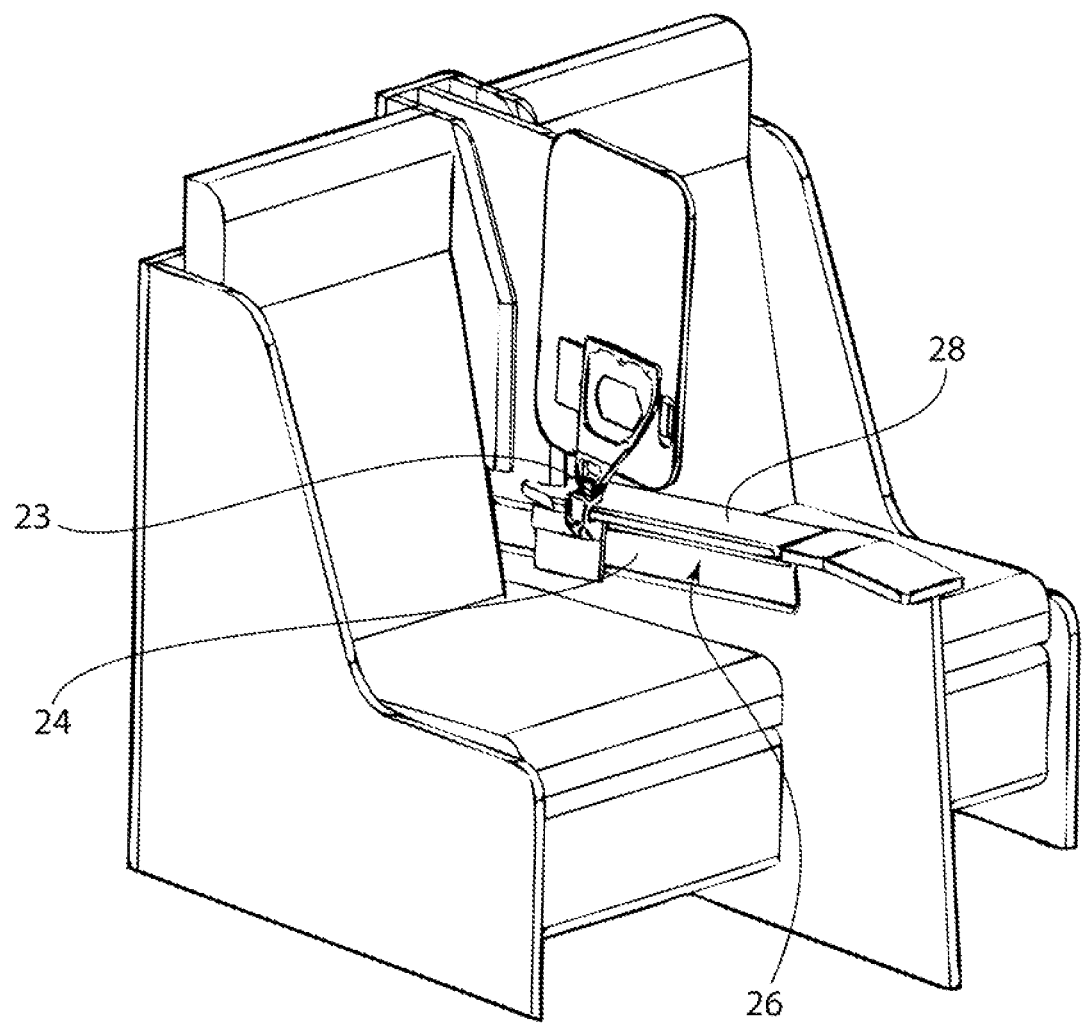
FIG. 6 shows a side perspective view of FIG. 5 with the tray table moving to its stowed position.

In the embodiment shown in FIGS. 5-6, the trays 18, 20 are positioned on a slide 22. In one embodiment, the center console 16 may be provided with a track 24 along its underneath surface 26 or alongside the console edge that allows the slide 22 to move forward and backward to effect movement of the trays 18, 20. When the passenger wishes to store the tray table, he rotates it upward along a hinge 23 and then slides it backward along slide 22. These figures also show a compartment 50 positioned between the headrests that may be used to provide a cleaner looking storage location for the tray tables, as well provides as an improved privacy feature between passengers.

Figure 7:
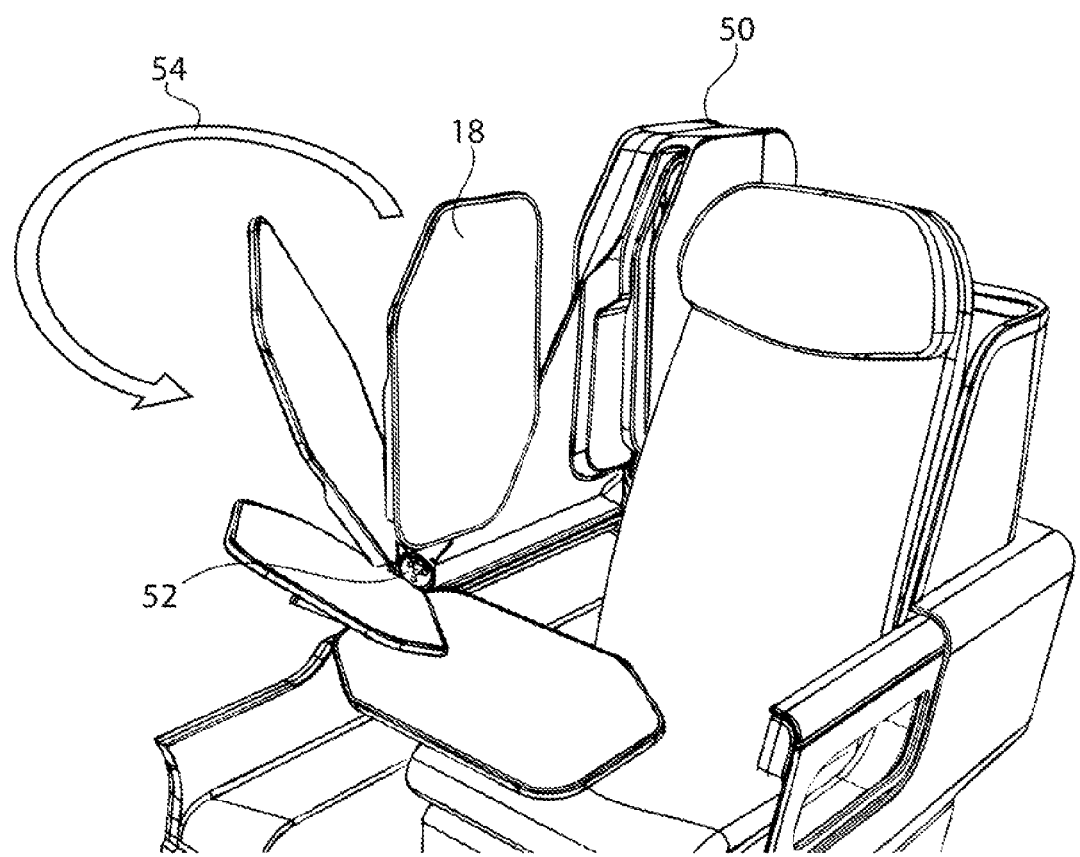
FIG. 7 shows a side perspective view of a second tray table embodiment, which rotates up and down.
Figure 8:
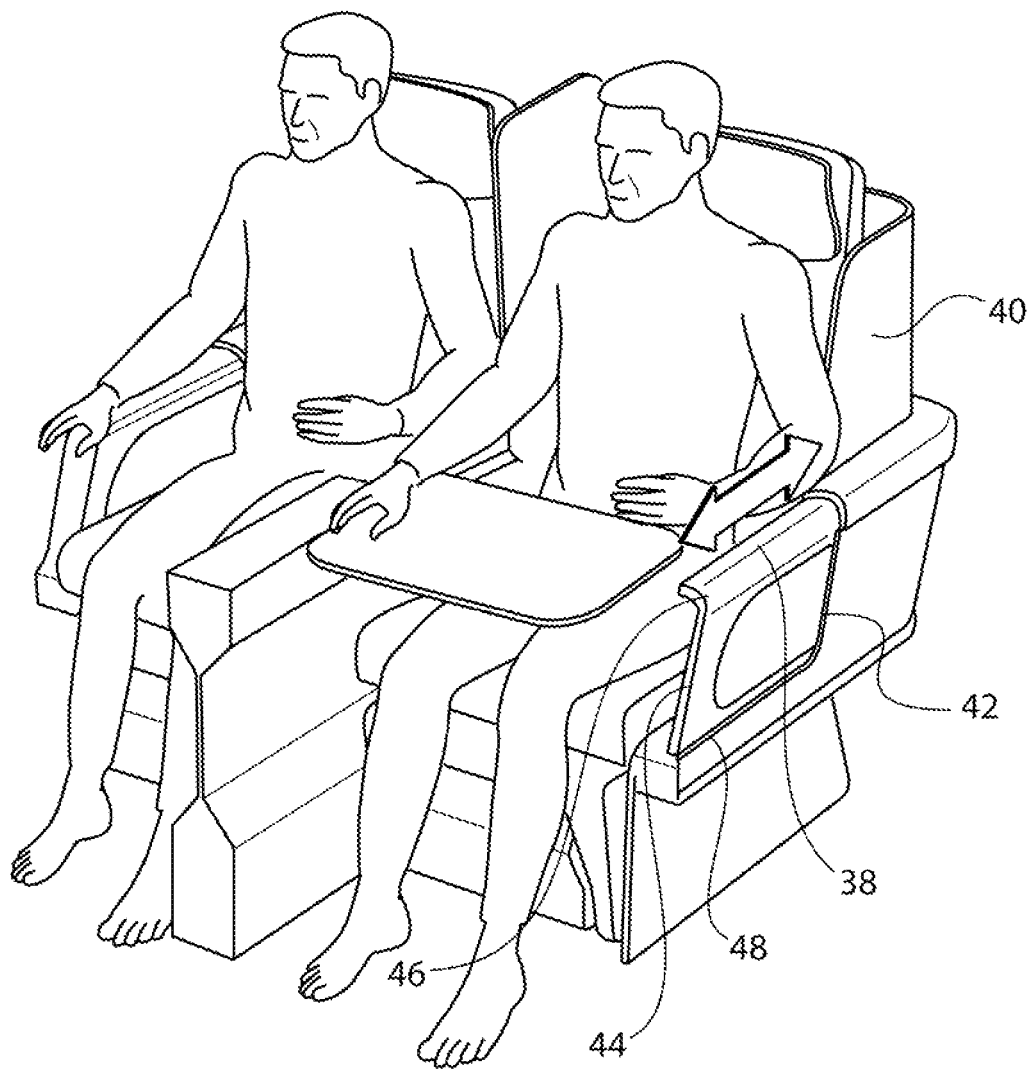
FIG. 8 shows a side perspective of a retractable and sliding outer armrest according to one embodiment of the invention.

FIG. 7 shows an alternate embodiment, with the tray table moveable on a slide, but having a pivot feature 52 configured to allow the food tray to be moved from its stored position to its fully deployed position. The table is allow to pivot around an oblique axis 54 in use.

In prior seat systems, a center console generally has in its lower portion, below the level of the armrest, a compartment designed to store the tray tables. When they are not in use, the passengers simply open a cover lid on the console and store the tray into the space provided therein. Such a compartment will have a minimum width which limits the space available for the passenger in bed position. The center console 16 of the present invention is designed to offer a maximum space to the passenger in bed position, minimizing the thickness of its mid portion 32, which acts only as a structural barrier between passengers. In other words, the mid portion 32 is not wide enough or thick enough to serve as a food tray stowage compartment, which allows the seating system to provide more leg room and space to the passenger, whether they are seated or in the lying down position.

The tray tables 18, 20 have been designed to be stored in a vertically upright position between head rest portions 36 of adjacent seats 12, 14, and above the armrest level. This provides a stowage location for the trays, but it also provides an additional privacy screen between passengers.

A further feature of the seating system 10 is a retractable outer armrest 38. The present invention provides an outer armrest with a design that allows the armrest 38 to slide back into an opening 42 in the privacy shell 40. In addition to increasing the ease of entry into the seat and to comply with regulations regarding accessibility for disabled passengers, this feature also increases the available width when the seat is in the bed position. When the armrest 38 is deployed, it affords a privacy enclosure to the passenger. The inner area provided by the curved shape provides a few extra centimeters or inches of valuable passenger space.

In a particular embodiment, the armrest 38 has a C-shaped cross section, provided by an outer panel 44 with an inwardly curved upper portion 46, as shown in FIG. 5. A lower portion of the seat shell may have a track 48 along which the armrest is configured to slide. The rear portion privacy shell is then provided with an opening 42 that can receive most (if not all) of the armrest 38 when it is in a retracted position.

Changes and modifications, additions and deletions may be made to the structures and methods recited above and shown in the drawings without departing from the scope or spirit of the invention and the following claims.

What is claimed is:

1. A seating system for a passenger transport vehicle, comprising:
   (a) a center console configured for positioning between first and second parallel passenger seats for providing a divider between the first and second parallel passenger seats, the center console comprising (i) an armrest section and (ii) a thin mid portion positioned below the armrest section and that is not wide enough to serve as a tray table stowage compartment;
   (b) at least one tray table configured to be positioned horizontally in use and configured to be stowed in a vertically upright position between head rest portions of the first and second passenger seats when not in use; and
   (c) a compartment positioned between the head rest portions for receiving at least a portion of the at least one tray table when stored in the vertically upright position.

2. The seating system of claim 1, further comprising a tray table slide and a hinge configured to allow the tray table to be moved from its stored position to its fully deployed position.

3. The seating system of claim 1, further comprising a tray table slide and a pivot configured to allow the tray table to be moved from its stored position to its fully deployed position.

4. The seating system of claim 1, wherein the center console further comprises a cocktail tray area and an armrest for passengers.

5. The seating system of claim 1, further comprising an outer armrest configured to slide into an opening in a privacy shell that surrounds at least one of the first or second passenger seats.

6. A seating system for a passenger transport vehicle, comprising:
   (a) a privacy shell;
   (b) a center console configured for positioning between first and second parallel passenger seats for providing a divider between the first and second parallel passenger seats, the center console comprising (i) an armrest section and (ii) a thin mid portion positioned below the armrest section and that is not wide enough to serve as a tray table stowage compartment;
   (c) at least one tray table configured to be positioned horizontally in use and configured to be stowed in a vertically upright position between head rest portions of the first and second passenger seats when not in use; and
   (d) a retractable outer armrest on one of the first or the second passenger seats configured to slide back into an opening in the privacy shell.

7. The seating system of claim 6, further comprising a compartment positioned at a rear portion of the center console and extending up to a position between the head rest portions for receiving at least a portion of the at least one tray table when stored in the vertically upright position.

8. The seating system of claim 6, wherein the armrest section of the center console comprises a shared armrest for the first and second passenger seats.

9. The seating system of claim 6, wherein the at least one tray table comprises a first tray table associated with the first passenger seat and further comprising a second tray table associated with the second passenger seat.

10. The seating system of claim 9, further comprising a slide associated with each of the first and second tray tables for causing movement of the tray tables.

11. The seating system of claim 1, wherein the at least one tray table comprises a first tray table associated with the first passenger seat and further comprising a second tray table associated with the second passenger seat.

12. The seating system of claim 11, further comprising a slide associated with each of the first and second tray tables for causing movement of the tray tables.

13. The seating system of claim 1, wherein the armrest section of the center console comprises a shared armrest for the first and second passenger seats.

14. The seating system of claim 1, wherein the compartment is positioned at a rear portion of the center console and extends up to a position between the head rest portions.

* * * * *